United States Patent [19]

Wicks et al.

[11] Patent Number: 4,841,872
[45] Date of Patent: Jun. 27, 1989

[54] RAILWAY TRAIN OF HIGHWAY VEHICLES, AND COMPONENTS THEREFOR

[75] Inventors: Harry O. Wicks; Monte P. Riefler, both of Hamburg, N.Y.

[73] Assignee: Railmaster System, Inc., Hamburg, N.Y.

[21] Appl. No.: 876,248

[22] Filed: Jun. 19, 1986

Related U.S. Application Data

[63] Continuation-in-part of Ser. No. 740,650, Jun. 3, 1985, Pat. No. 4,669,391, which is a continuation-in-part of Ser. No. 469,215, Feb. 24, 1983, abandoned.

[51] Int. Cl.$^4$ .............................................. B61D 3/12
[52] U.S. Cl. .................................... 105/4.3; 280/408; 410/53
[58] Field of Search ............................ 105/3, 4.1–4.3, 105/159, 199.1, 199.3, 199.4, 215.1, 215.2; 213/86, 188, 189, 192; 280/408, 423 A, 476 R, 477, 515; 410/44, 45, 53, 54, 56

[56] References Cited

U.S. PATENT DOCUMENTS

| | | |
|---|---|---|
| 1,786,463 | 12/1930 | Thomas . |
| 2,035,535 | 4/1936 | Nelson .............................. 410/53 X |
| 2,170,095 | 8/1939 | Ronk . |
| 2,230,090 | 1/1941 | Rabey . |
| 2,513,552 | 7/1950 | Dove . |
| 2,638,852 | 5/1953 | Bannen . |
| 2,709,969 | 6/1955 | Andert .................................. 410/53 |
| 2,787,971 | 4/1957 | Obes . |
| 2,800,086 | 7/1957 | Wike . |
| 2,816,517 | 12/1957 | Candlin, Jr. et al. . |
| 2,826,155 | 3/1958 | Larsson . |
| 2,841,094 | 7/1958 | Schumacher . |
| 2,889,785 | 6/1959 | Browne . |
| 2,920,580 | 1/1960 | Williams . |
| 2,925,791 | 2/1960 | Browne et al. . |
| 2,963,986 | 12/1960 | Dodson ........................ 105/215.2 X |
| 3,002,469 | 10/1961 | Wanner . |
| 3,081,115 | 3/1963 | Dickey et al. . |
| 3,286,654 | 11/1966 | Fisher . |
| 3,286,657 | 11/1966 | Browne . |
| 3,342,141 | 9/1967 | Browne . |
| 3,371,622 | 3/1968 | Lich . |
| 3,687,084 | 8/1972 | O'Leary et al. ..................... 105/4.1 |
| 3,721,199 | 3/1973 | Hassenauer . |
| 3,812,791 | 5/1974 | Barnard . |
| 4,179,997 | 12/1979 | Kirwan . |

(List continued on next page.)

FOREIGN PATENT DOCUMENTS

| | | |
|---|---|---|
| 0143614 | 5/1985 | European Pat. Off. . |
| 1455169 | 3/1969 | Fed. Rep. of Germany . |
| 3344513 | 6/1985 | Fed. Rep. of Germany . |
| 1512601 | 1/1968 | France . |
| 287955 | 2/1928 | United Kingdom . |

OTHER PUBLICATIONS

Railmaster, "The Intermodal Revolution", Sep. 1984.
Caprino, "New Truck-Rail System Eyed Here", Buffalo Evening News, 10/6/84.
Callahan, "Railmaster:Getting America into Truck/Training", Truck & Off-Highway Industries, Aug. 1985.
ITE Upstate Section Newsletter, published at Buffalo, N.Y., at least as early as Feb. 14, 1983.

*Primary Examiner*—Johnny D. Cherry
*Attorney, Agent, or Firm*—Marshall, O'Toole, Gerstein, Murray & Bicknell

[57] ABSTRACT

An improved railway train of highway trailers. The highway trailers are interconnected to each other and their adjacent ends are supported solely by railtruck assemblies. Each trailer is provided with a portion connectible to a corresponding portion of the railtruck assembly. Each railtruck assembly includes an intermodal adapter mounted upon a transversely extending bolster of a railtruck, the assembly being essentially symmetrical about a vertically shiftable coupler pin carried by the adapter so that the railtruck assembly can be interconnected to trailers disposed to either side of the railtruck assembly. In addition, improved hydraulic shifting apparatus is provided for shifting the vertical coupler pin carried by the intermodal adapter.

44 Claims, 9 Drawing Sheets

U.S. PATENT DOCUMENTS

| | | |
|---|---|---|
| 4,202,276 | 5/1980 | Browne et al. . |
| 4,202,277 | 5/1980 | Browne et al. . |
| 4,202,454 | 5/1980 | Browne et al. .............. 105/215.2 X |
| 4,316,418 | 2/1982 | Hindin et al. . |
| 4,342,265 | 8/1982 | Hindin et al. . |
| 4,364,315 | 12/1982 | Beatty . |
| 4,381,713 | 5/1983 | Cripe . |
| 4,397,243 | 8/1983 | Hickman . |
| 4,400,121 | 8/1983 | Krull et al. . |
| 4,405,271 | 9/1983 | Adams . |
| 4,416,571 | 11/1983 | Krause ............................ 105/4.1 X |
| 4,448,132 | 5/1984 | Beatty . |
| 4,452,147 | 6/1984 | Jwuc . |
| 4,456,413 | 6/1984 | Pavlick . |
| 4,474,707 | 3/1986 | Hickman . |
| 4,585,133 | 4/1986 | Cope . |
| 4,665,834 | 5/1987 | van Iperen ........................... 105/4.1 |

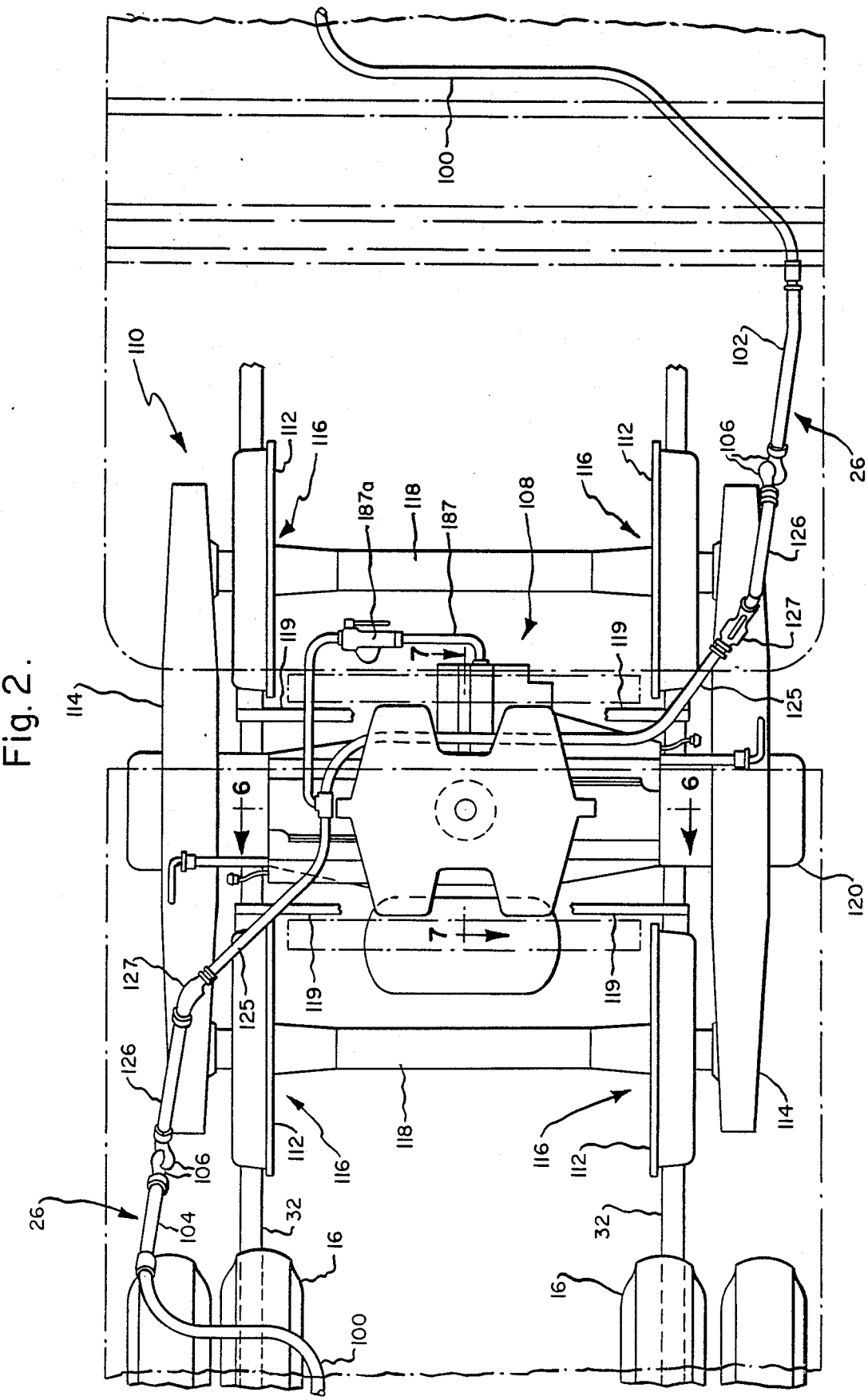

RAILWAY TRAIN OF HIGHWAY VEHICLES, AND COMPONENTS THEREFOR

CROSS REFERENCE TO RELATED APPLICATIONS

The present invention is a continuation-in-part of U.S. application Ser. No. 740,650 filed June 3, 1985, now U.S. Pat. No. 4,669,391, which is in turn a continuation-in-part of U.S. application Ser. No. 469,215 filed Feb. 24, 1983, now abandoned.

FIELD OF THE INVENTION

The present invention relates generally to an improved railway train of highway vehicles formed of a railtruck assembly and leading and following highway trailers, the railtruck assembly providing the sole support for adjacent ends of the highway trailers when made into a railway train of highway trailers.

BACKGROUND

In applicant's copending U.S. application Ser. No. 740,650 an adapter is provided on a railtruck which can be in turn coupled to a receiving portion of a leading trailer. While this design performs in a satisfactory manner, it has the disadvantage in being unidirectional. In addition, the manually operated screw jack utilized in the prior design to shift the coupled pin may not be suitable for use when the trail is under heavy tension or compression, due to steep grades or long train consists.

OBJECTS OF THE INVENTION

A first principal object of the present invention is to provide a railtruck assembly which can be coupled to a leading trailer, the railtruck assembly being bidirectional so that it can be coupled to a leading trailer disposed to either side of the bolster of the railtruck assembly.

It is another principal object of the present invention to provide a hydraulic jack capable of moving the coupler pin upwardly or downwardly with sufficient force so that a unit train can be broken up while under tension or compression.

As hydraulic power sources are not readily available in sidings, it is a further object of the present invention to provide a hydraulic jack which can be operated by air, when air is available, or alternatively, which can be operated manually on those occasions when air is not available.

The above objects and other objects and advantages of the present invention will become apparent from a consideration of the following detailed description taken in conjunction with the accompanying drawings in which a preferred form of this invention is illustrated.

BRIEF DESCRIPTION OF THE DRAWINGS

FIG. 2 is a plan top view of the railtruck assembly of this invention coupled to the rear end of a leading highway trailer, the rear end of the leading highway trailer and the forward end of the following trailer being illustrated in phantom lines.

DETAILED DESCRIPTION

Figure 1:
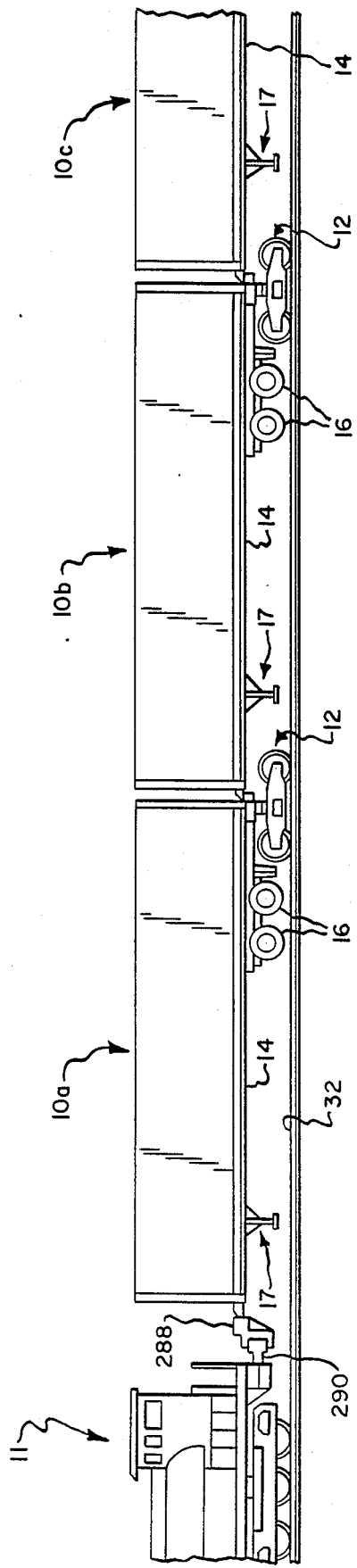
FIG. 1 is a diagramatic view of a railway train consisting of a locomotive and a plurality of highway trailers supported at their adjoining ends solely by railtruck assemblies.

A railway train of highway trailers is shown in FIG. 1, which train corresponds generally to the trains illustrated in applicant's corresponding U.S. Pat. application Ser. No. 740,650 filed June 3, 1985, the subject matter of which is incorporated herein by reference thereto. Thus, modified highway trailers 10a, 10b, 10c are assembled into a unit train as shown in FIG. 1 with the front end of the first leading highway trailer 10a being connected to and supported by a locomotive 11 (or a transition car), with adjacent ends of the highway trailers being supported solely by railtruck assemblies indicated generally at 12, and with the rear end of the last following highway trailer 10n (FIG. 13) also being supported by a railtruck assembly 12. An end-of-train lighting device and air pressure monitoring device will be mounted upon the last railtruck of the unit train. Each of the railtruck assemblies includes a conventional railtruck and an intermodal adapter. The intermodal adapter is, in turn, provided with a load bearing locating surface, a coupler pin, and additional components, all of which will be described in detail below.

Figure 2A:
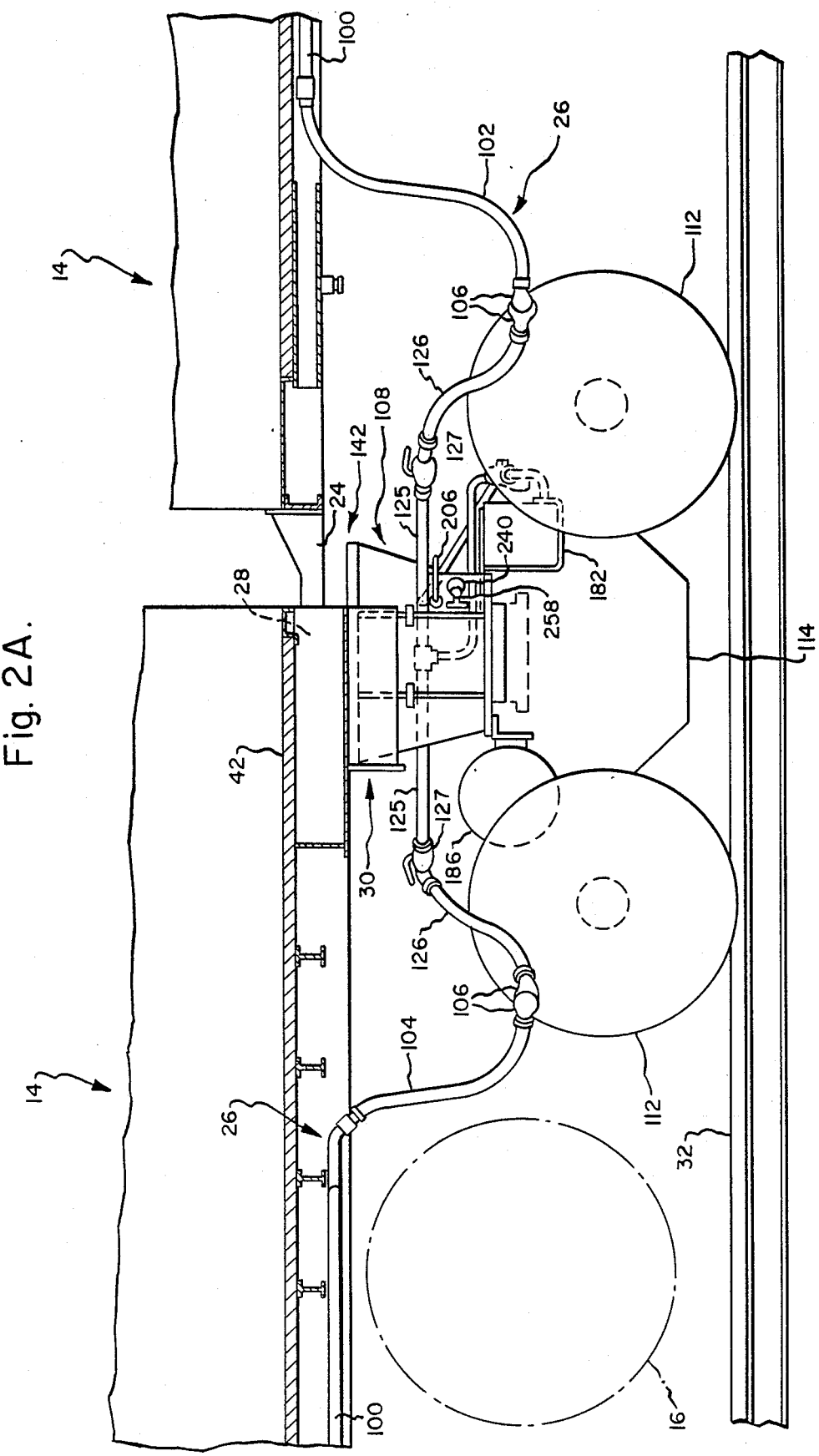
FIG. 2A is a side elevation view of the railtruck assembly shown in FIG. 2, portions of the railtruck being omitted for clarity, and associate portions of trailers 10a, 10b, 10c being shown in full lines.

The highway trailers 10a, 10 b, 10c are of a generally conventional design and thus each have a body 14 supported by highway wheel assemblies 16 and which are additionally provided with suitable adjustable support leg assemblies 17. Each of the adjustable support leg assemblies includes a pair of load supporting, telescoping legs which are mounted at either side of the trailer's longitudinal center line and (in the United States and Canada) are spaced 4' 11½" apart which distance is the normal center line distance of the rails of a standard gauge railway track. At the lower end of each of the telescopic legs there is a plate configured with a longitudinally extending recess which will provide a centering means for the plates when resting upon the head of the track rails and also a flat plane for resting upon a flat surface. While the bodies shown in the drawings are of a monocoque van design, other body styles may be employed. Thus, each of the bodies may be a van trailer having a load supporting continuous frame, a highway trailer designed to receive detachable containers, a highway trailer for use in carrying automobiles, a highway trailer with a liquid carrying tank mounted thereon, a highway trailer which is surmounted by any type of special purpose body or container, a highway trailer having a telescopic frame for supporting the mountable containers of various lengths or widths or types, etc. Each highway trailer will be provided with a forward king pin 18 (FIG. 10) to permit the highway trailer to be connected to a conventional fifth wheel assembly 20 of a tractor 22. Thus, each of the highway trailers may be used for normal highway transport. Accordingly, the trailer has all required highway safety features including, but not necessarily limited to bumpers, lights, air brake systems and the like. However, it is necessary to modify the trailers 10a, 10b, 10c somewhat to permit their use in the unit train shown in FIG. 1. Thus, each highway trailer is constructed with appropriate reinforcement that will withstand push and pull (buff and draft) forces in both the highway and railway mode, and will also withstand lateral forces generated by rocking and sway, and upward forces caused by its resting upon the intermodal adapter when in the rail mode. In addition, each highway trailer is provided with a forwardly extending load supporting tongue 24 (which is apertured at its forward end), and a rail air brake line assembly 26 (FIG. 2). In addition, the rear end of each trailer is provided with first receiving means 28 (FIG. 2A) for receiving and being removably coupled to the forward apertured end of the load supporting tongue 24 of a following trailer. Also, the rear end of each trailer is further provided with a second receiving means 30 for receiving and being removably coupled to load supporting locating means on the intermodal adapter. As it is necessary that the highway wheel assemblies 16 be raised above the rail track 32 when formed into a unit train, it is also desirable that means be provided for vertically shifting of the highway wheel assemblies 16 relative to the body 14 of the trailer. Various different types of means may be provided for such a purpose. Thus as shown in FIGS. 10-13, each highway trailer is additionally provided with a highway wheel assembly elevating system 34 which may be of the type shown in U.S. Pat. No. 4,568,094 issued Feb. 4, 1986 to Patrick A. Lovell, the subject matter of which is incorporated herein by reference thereto. By utilizing a design of the type shown in the aforementioned U.S. patent, it is possible to mount the highway wheel assemblies 16, which include conventional axles and wheels, on a standard suspension system. In order to insure that the highway wheel assemblies 16 are properly positioned for highway and rail transport, the elevating system 34 is in turn mounted on a subframe 36, which is longitudinally adjustable.

The provision of the tongue 24 and the necessary structural reinforcements for the tongue stresses is the only major modification necessary to the front end of the highway trailer 10a, 10b, 10c. As can best be seen from FIG. 5, the forward end of the tongue is provided with a vertically extending hour-glass shaped aperture 38 which is defined by a hardened steel bushing insert 40.

The first receiving means 28 is located at the rear of the trailer body 14 midway between the sides of the body and immediately below the floor 42 of the body.

Figure 5:
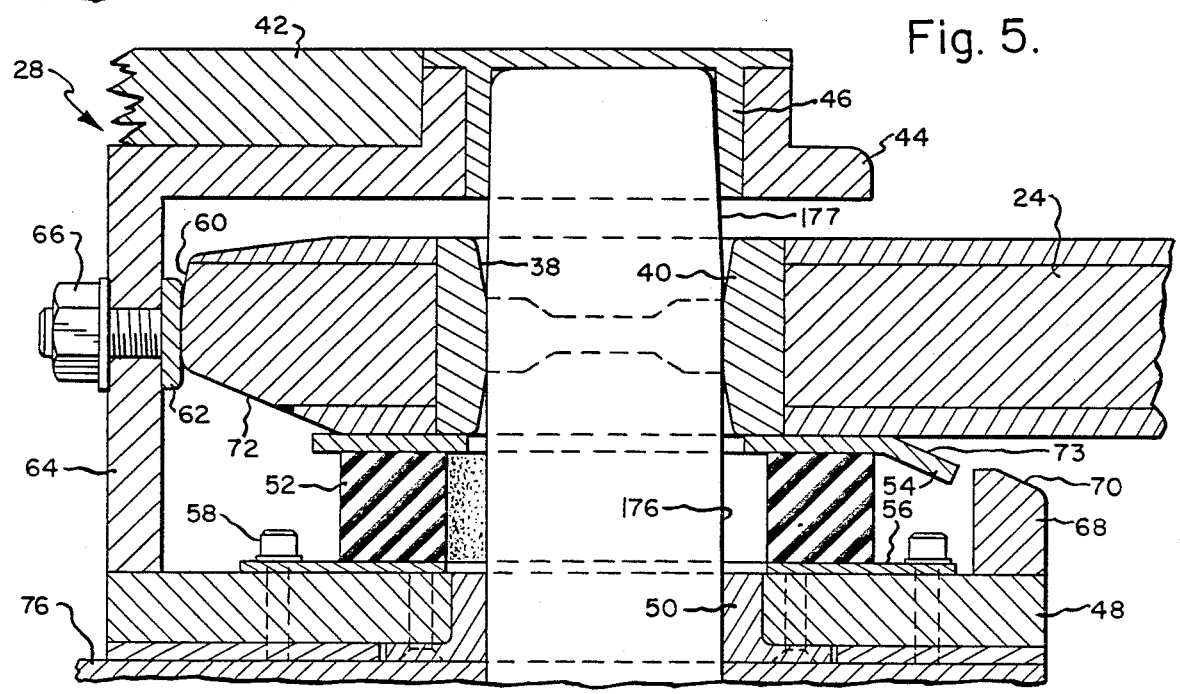
FIG. 5 is an enlarged view similar to FIG. 4, and additionally illustrating how the tongue is secured by a coupler pin to the socket on the rear of a leading trailer.

As can best be seen in FIG. 5, the first receiving means includes an upper portion 44 provided with an aperture defined by insert 46, a lower portion 48 provided with a lower coaxially aligned aperture defined by insert 50 and laterally spaced apart sidewalls (not shown). In order to provide support for the forward end of the apertured tongue, an elastomeric pad assembly is disposed therein, the elastomeric pad assembly including an elastomeric bushing 52 and upper and lower apertured plates 54, 56, respectively, the lower plate 56 being secured to the lower portion 48 by fasteners 58. In order to insure that the forward end surface 60 of the tongue is in its proper position when fully inserted into the first receiving means so that the hourglass shaped aperture in bushing 40 is in coaxial alignment with the apertures in inserts 46 and 50, a stop 62 is provided, which stop is mounted on the forward transversely extending wall 64 of the first receiving means by a nut 66. Thus, the stop is essentially the head of a bolt which is of the proper thickness to insure that the forward end of the tongue will be properly positioned when inserted. To facilitate the insertion of the tongue into the first receiving means, a guide member 68 is welded or otherwise rigidly secured to the lower portion 48, the guide member 68 having a cam surface 70 which can engage a corresponding cam surface 72 on the lower forward end of the tongue to facilitate the insertion of the tongue into the first receiving means. Similarly, the rear edge of the top plate 54 is also provided with such an angled cam surface 73.

Figure 3:
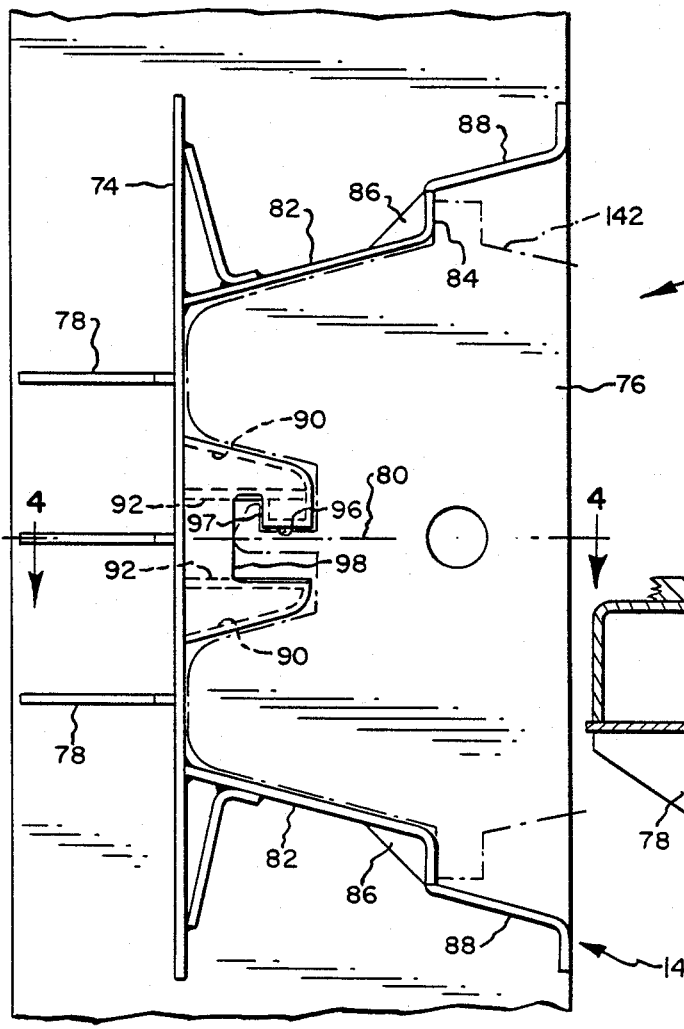
FIG. 3 is a bottom plan view illustrating the receiving means on the rear end of a highway trailer which receives a portion of the load bearing locating means of the railtruck assembly, which load bearing locating means is illustrated in phantom lines.
Figure 4:
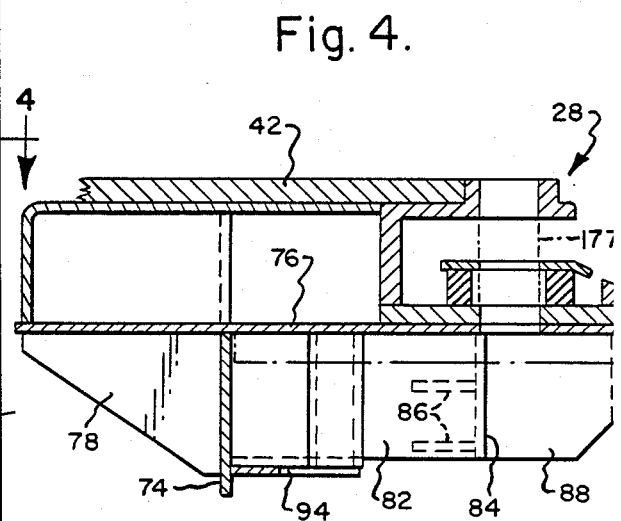
FIG. 4 is a section taken generally along the line 4—4 in FIG. 3 and additionally illustrating the receiving socket which receives the tongue of a following trailer, an elastomeric loadcarrying pad upon which the tongue rests and which allows the tongue to move fore and aft and side to side in relationship to the vertical axis, a portion of the horizontal top plate of the intermodal adapter, which top plate forms the load bearing locating means, also being shown in phantom lines.

The second receiving means 30 is best illustrated in FIG. 3. It includes a transversely extending vertical plate 74 which is welded to a horizontal plate 76 (FIG. 4) disposed immediately below the first receiving means and extending forwardly and to the sides of the first receiving means. The plate 74 is further reinforced by gussets 78. To the sides of the longitudinally extending center line 80 of the trailer are laterally spaced apart angled gathering plates 82 provided at the rear with a transversely extending stop surface 84 reinforced by gussets 86. A further angled plate 88 extends from stop surfaces 84 to the rear of the trailer body 14 and is suitably welded in place. Disposed between the forward ends of the gathering plates 82 is a nose piece assembly consisting of angled plates 90, and spaced apart longitudinally plates 92, these plates also being suitably welded to the horizontal plate 76 and to a lower horizontal plate 94. A suitable latching member, which can be a U-shaped channel member 96, is rigidly secured to one of the spaced apart longitudinally extending plates 92 and provides a latching surface 97 which can be engaged by a latch carried by the intermodal adapter to secure the intermodal adapter to the second receiving means. In order to prevent trash from accumulating above the horizontal plate 94 which would interfere with the operation of the latch, a suitable cutout 98 is provided in the plate.

The rail air brake line assembly 26 for the trailer includes a relatively large diameter steel air line pipe 100 (FIGS. 2 and 2A) suitably secured to the bottom of the trailer and short front and rear flexible air line sections 102, 104, respectively, ending in "glad hand" air line connectors 106. The highway trailer is provided with, near the terminations of the train air line 100, a box or container for inserting the "glad hand" to protect it from the entry of dirt and debris and at the same time supporting it above the lower horizontal surface of the trailer body structure so that the "glad hand" and the associated flexible air line will not catch upon any objects on the highway tractor or elsewhere when the highway trailer is used in the highway mode.

While many highway tractors are provided with a source of auxiliary air, in some situations the highway trailers of this invention will be used with tractors which do not have such a source of auxiliary air. Therefore, it is desirable that a tee connection be provided at an appropriate location in the highway brake air line and furthermore that a secondary air line be provided which runs from the tee to an air takeoff connection at the rear of the trailer, the air takeoff connection being provided with a suitable shut-off valve.

Each railtruck assembly, as previously noted, consists of an intermodal adapter which is indicated generally at 108 and a conventional two axle, four wheel railtruck indicated generally at 110. Each railtruck assembly is provided with a service brake system and a parking brake system. The service brake system may be similar to the Buffalo Brake Beam Company "Unipac", the Westinghouse Air Brake Company "Wabcopac", etc. Thus, each of the railtruck assemblies will include suitable control valves, air reservoir, brake crossover piping, flexible air connectors, shut-off cocks, and the like, so as to make the railtruck assembly, in effect, a complete, although, abbreviated rail car. Some of the braking components are carried by the intermodal adapter/coupler, and others by the railtruck, and various of the components will be discussed below. The railtruck may be a Dresser model DR-1 radial truck, a Barber stabilized truck model S2-C with appropriate diagonal bracing between side frames, like the Urban Transportation Development Corporation (UTDC) Bracing, or the equivalent.

Figure 11:
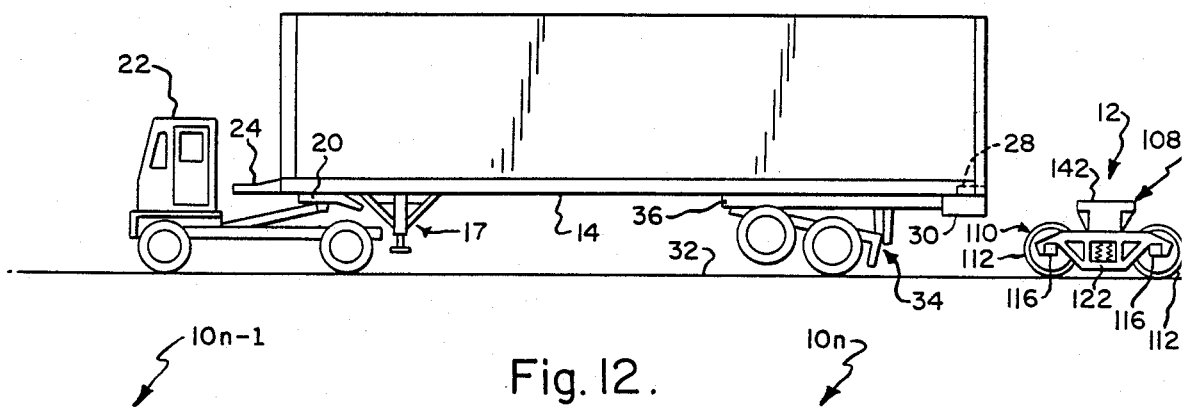
Figure 12:
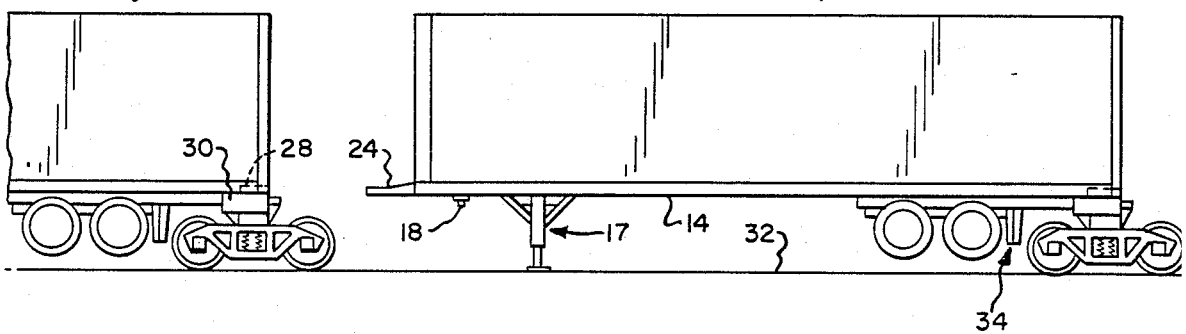

As is well known to those skilled in the art, each railtruck includes rail wheels 112 which are supported on the tracks 32 and longitudinally extending side frames 114 supported by suitable bearings 116 on axles 118. Air operated brake assemblies 119 are carried by the side frames 114. A transversely extending bolster 120 is supported on the side frames by suitable spring assemblies 122 (FIG. 11). The bolster 120 is provided with an apertured centrally located center plate bowl 124 (FIG. 7), and laterally spaced apart portions of the bolster carry constant contact side bearings (not shown). In order to connect to the mechanism for operating the brakes 119, a rigid air line 125 is provided which terminates at either end in flexible air lines 126 also provided with "glad hand" air line connectors 106. A suitable shut off valve or cock 127 is disposed between the end of the rigid line 125 and the flexible lines 126.

The intermodal adapter 108 includes a principal welded frame assembly indicated generally at 128 (FIG. 7), the frame assembly being secured at its lower surface to a center plate 130 via ring 132. The center plate 130 is in turn provided with a downwardly extending center plate pin 134 which is received within the aperture of the apertured center plate bowl 124 and may be secured with a locking device (not shown). While the above described connection is the conventional manner in which a freight rail car is secured to its railtruck, in accordance with this invention, additional stabilizing means are provided in the form of forwardly and rearwardly positioned stabilizing pins 136 which are provided with heads 138 at their lower end, the pins passing between the bolster 120 and front and rear straps 140 which are welded or otherwise rigidly secured to the bolster. The purpose of the headed pins (which may be bolts) and straps 140 is to prevent the intermodal adapter 108 from overturning during assembly to, or disassembly from, a highway trailer.

Figure 8:
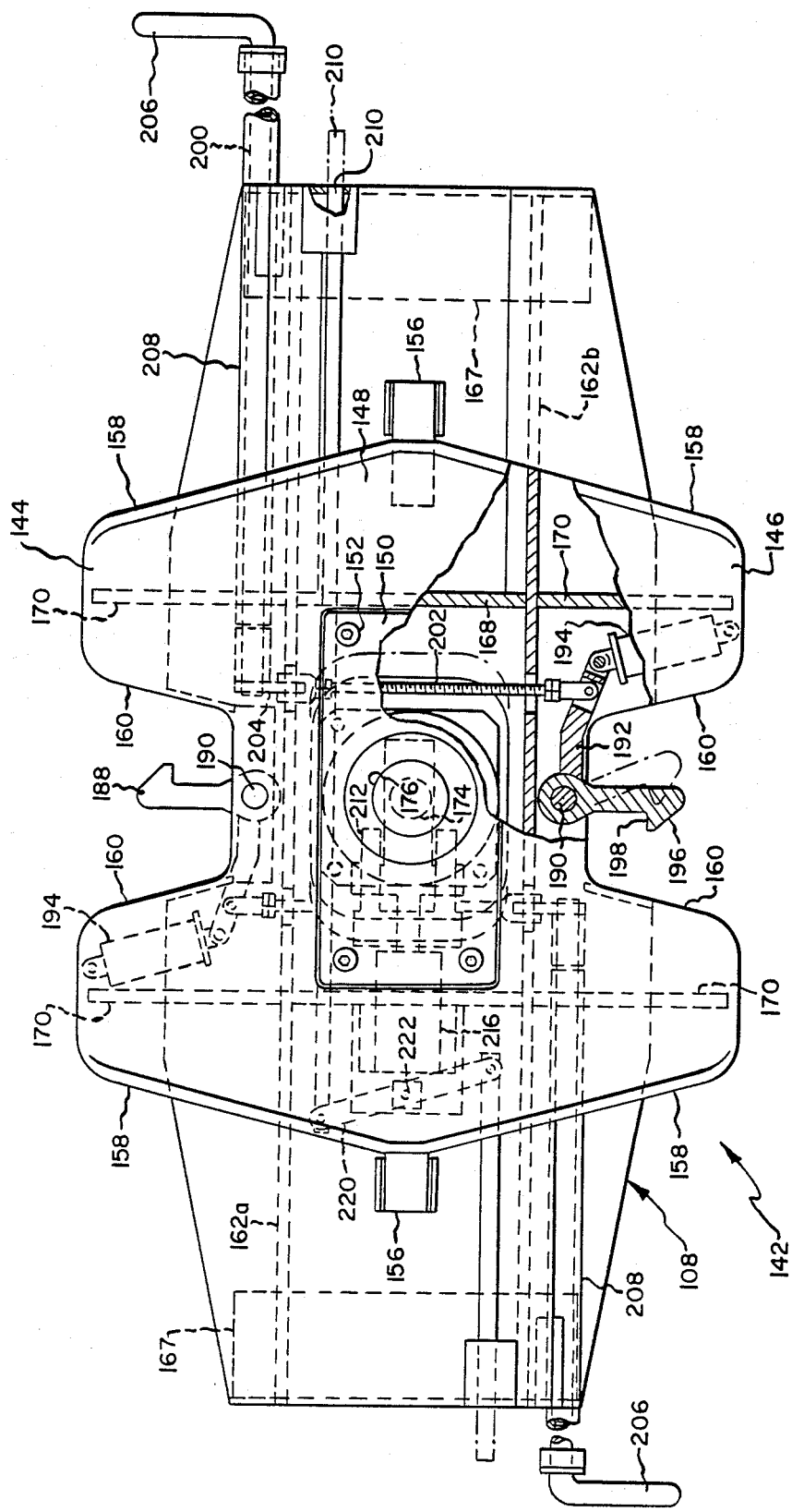
FIG. 8 is a top plan view of the adapter shown in FIG. 2 showing additional details of its mechanical construction.

The upper surface of the welded frame assembly is welded or otherwise rigidly secured to load bearing locating means indicated generally at 142. In accordance with this invention, the railtruck assembly is bidirectional and thus the load bearing means is also bidirectional. Accordingly, the load bearing locating means is provided with substantially identical forwardly and rearwardly extending load bearing and locating portions 144, 146, respectively. These portions are integral with an intermediate load bearing portion 148 (FIG. 8). The portions 144, 146 and 148 are all formed from a single metal plate approximately 1.5 inches in thickness which is cut to the appropriate dimensions. In order to provide access to components disposed within the frame assembly 128, a central portion of the intermediate portion is cut out and an apertured removable plate 150 is inserted in the cutout, the removable plate being secured in place by fasteners 152 in such a manner than the top surface of the plate 150 is coextensive with the top surface of the portions 144, 146, 148. A coupler pin guide tube 153 is inserted and welded into plate 150 or, alternatively, plate 150 and guide tube 153 may be cast integrally. Brackets 154 are welded to laterally spaced apart portions of the intermediate load bearing portion 148 of the load bearing locating means 142 and stops 156 are in turn secured to the top surface of the brackets with the upper surface of the stops lying in the plane of the top surface of the load bearing locating means or preferably slightly below it. As can best be seen from FIG. 8, the portions 144 and 146 have a generally W-shaped configuration which will conform to the second receiving means 30 carried by the body of the trailer. Thus, each portion 144, 146 has angled beveled sides 158 which can engage the gathering plates 82 and additional angled sides 160 spaced inwardly of the sides 158, the additional angled sides 160 being capable of engaging the angled plates 90 of the nose piece disposed within the second receiving means.

Figures 7, 7A:
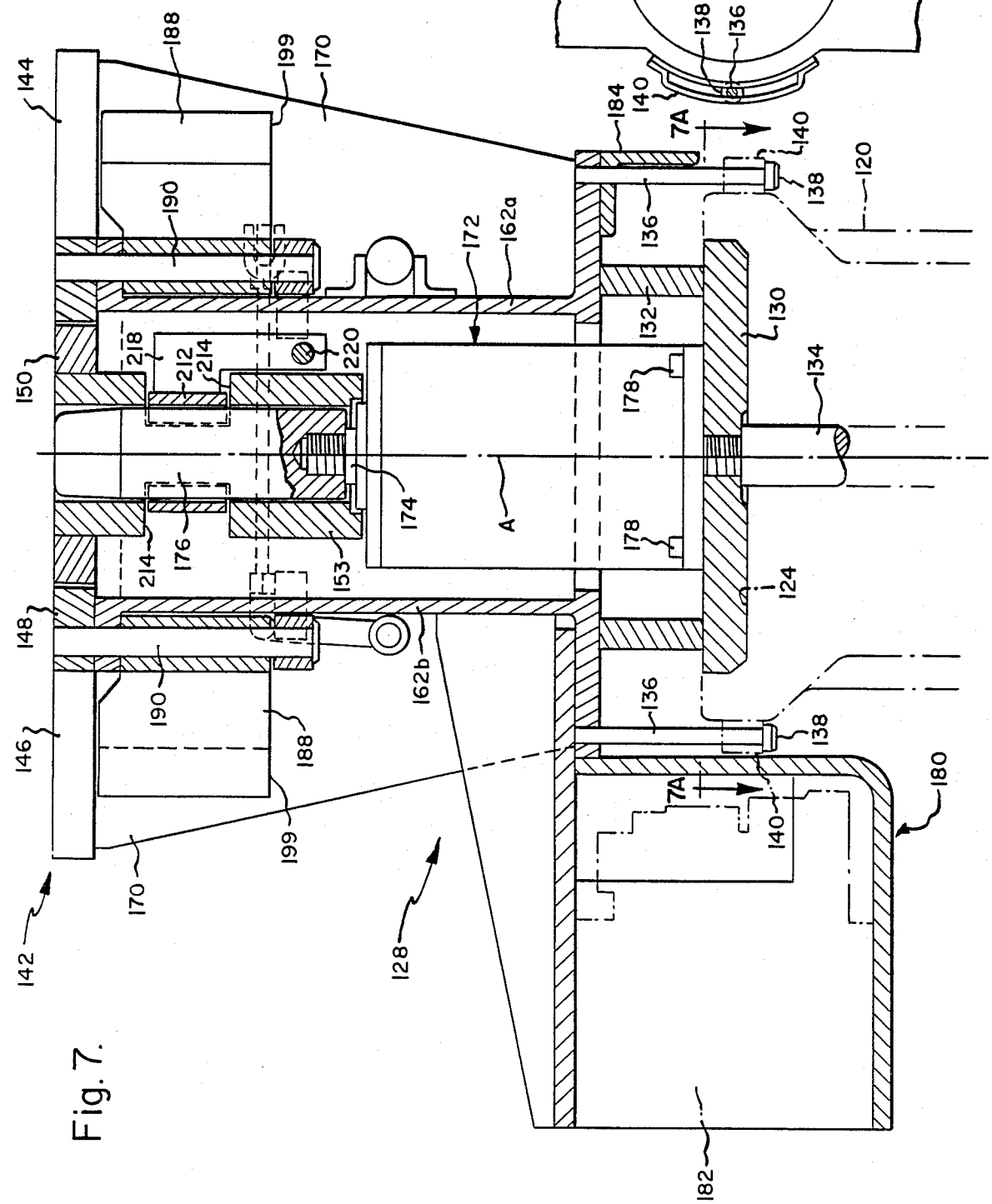
FIG. 7A is a section taken generally along the line 7a—7a in FIG. 7.

The welded frame assembly 128 includes two principal transversely extending vertical plate members 162a, 162b. Upper and lower horizontal plate members 164, 166, respectively, are associated with each of the transverse plate members. As shown in FIG. 7, each of the plate members 162a or 162b and its associated upper and lower plate members 164 and 166 are formed from a single I-beam, however, a welded assembly can be utilized. In any event, it will be necessary to provide suitable cutout portions in each of the plates 162, 164, 166 to receive various components of the adapter. In addition wear plates 167 are provided on the lower surfaces of plate 166, the wear plates 167 being adapted to contact constant contact side bearings on the bolster. A pair of laterally spaced apart longitudinally extending plates 168 are disposed between the plate members 162a and 162b and extend from top plate 164 to bottom plate 166. Reinforcing plates 170 are also disposed to the forward side of transverse plate 162a and to the rear side of transverse plate 162b, these reinforcing plates in turn being secured at their top edge to the forwardly and rearwardly extending load bearing and locating portions 144 and 146 of the load bearing locating means 142 and at their bottom to bottom plates 166. It can thus be seen that a rigid frame assembly 128 is provided which assembly can easily support the loads imposed upon it.

A double acting hydraulic cylinder assembly 172 is disposed within a central portion of the welded frame assembly 128, the central portion being defined by plate members 162a, 162b and longitudinally extending plates 168. The rod end 174 of the cylinder assembly is coupled to a vertically shiftable coupler pin 176. The coupler pin is shown in its lower position in FIG. 7 and in its elevated position in FIG. 5. As can best be seen from FIG. 5, the upper end portion of pin 176 is provided with a tapered surface 177 to facilitate its entry into the bushing 40 and apertured inserts 50 and 46, the aperture in insert 46 conforming to the upper end of pin 176. When the pin 176 is coupled to the apertured tongue, it will be held in double shear and provide a relatively "slackless" coupling of one trailer to another. In order to provide sufficient stroke for the cylinder assembly 172, the lower plate 166 is cut out within the central portion and the lower end of the cylinder assembly is fastened to the center plate bowl 130 by fasteners 178. Supported on a portion of the frame assembly 128 is a bracket assembly 180 which receives the ABDW brake control valve 182 or any other suitable brake control valve for the railtruck air brakes. Similarly, a bracket 184 is also carried by the frame assembly, the bracket supporting the air reservoir 186. An air line 187 extends from line 125 to the ABDW valve, this line also being provided with a suitable shut-off valve 187a.

Forwardly and rearwardly extending substantially identical latches 188 (FIGS. 7 and 8) are carried by the adapter, the latches each being pivoted on a vertically extending pin 190. Rigidly secured to each of the latches 188 is an arm 192, the end of the arm 192 remote from the pivot pin 190 being interconnected to a spring assembly 194 which will normally cause the latch to be biased to its full line position shown in FIG. 8 but which will permit the latch to be swung to its dotted line position when the outer cam surface 196 of the latch is engaging the latch member 96 during assembly of the railtruck assembly to the rear receiving means 30 of a highway trailer. When the railtruck assembly is fully assembled to the highway trailer, the planar surface 198 of the latch will engage the latching surface 97 of the latch member 196 to hold the parts together and the stops 156 will engage the surfaces 84. In addition, while the lower surface 199 of the latches 188 will clear the top surface of the plate 94, the engagement between the latching surfaces 198 and 97, as well as other engagements, will provide brake torque reacting means whereby the intermodal adapter will resist tipping forward when the brakes of the rail truck are applied.

While the latches 188 will couple automatically, it is necessary to manually release the latches when it is desired to break up a train. To this end a latch release lever is provided for each latch. The mechanism for releasing the forward latch 188 as shown in FIG. 8 will be to the left hand side of the railtruck and disposed as far as possible to the rear. This location is desirable since the latch release mechanism should be disposed to the rear of the trailer when coupled to the railtruck assembly, and should also be preferably on the driver side of the vehicle which will be used to transport the trailer away from the adapter. Since the railtruck assembly is designed for coupling to a trailer in either direction, another latch release mechanism is provided for releasing the rear latch as shown in FIG. 8, this mechanism being disposed in a forward right hand position.

The latch release mechanism includes a rock shaft 200 journalled on the intermodal adapter frame, the inner end of the rock shaft being connected to a link 202 by a rock arm 204. The other end of the rock shaft 200 is provided with a suitable manually engageable handle 206. By rotating the handle 206 in a clockwise direction as viewed in FIG. 2a, the forwardly extending latch will be swung to a releasing position whereby the trailer can be disconnected from the railtruck assembly by relative movement away from each other. The rock shaft 200 is supported by a suitable bearing which, for example, may simply be a tube 208.

In order to indicate when the coupler pin 176 is in its fully raised position, a coupler pin indicating mechanism is provided. As the design of the railtruck assembly is essentially symmetrical, the coupler indicator rods 210 extend to either side of the welded frame assembly 128. When the coupler pin is in its fully raised position, the coupler pins will extend outwardly as shown in phantom lines in FIG. 8, but will otherwise be in their full line position. The coupler indicator rods are caused to be operated by a yoke or fork member 212. The spaced apart arms of the member 212 are received within cutouts 214 in the coupler guide tube 153. The member 212 is carried by the rod end of a single action air cylinder assembly 216, the rod normally being spring biased to the right hand position as shown in FIG. 8 but which may be retracted by the operation of the cylinder assembly when air is introduced into the cylinder. It alternatively may be desirable to operate the lock fork 212 by suitable manual means, thus eliminating the cylinder 216 in its entirety and substituting therefor an appropriate mechanical lever means with a similar spring bias means. When the coupler pin 176 is in its fully raised position, the bottom of the coupler pin will be above the upper surface of the cutouts 214 and the yoke 212 can then extend beneath the coupler pin and straddle the rod 174. When in this position, the yoke will not only serve to indicate the position of the coupler pin, but will also prevent the coupler pin from dropping in the event that there is a loss of hydraulic fluid from the cylinder assembly 172. The yoke carries a bracket 218 through which one of the indicator rods 210 passes, the rod 210 being secured to the bracket in any conventional manner. One end of the rod 210 is pivotally secured to a pivoting link 220 and the inner end of the other rod is secured to the other end of the pivoting link, the link pivoting about a centrally located pivot pin 222. It can be seen from an inspection of FIG. 8 that if the yoke member 212 were to be shifted from the position indicated where it bears against the coupler pin to a right hand position where it would straddle the rod 174 of the cylinder assembly 172, the uppermost indicator rod 210 would be shifted to the right and by the action of the pivoting link 220 the lowermost indicator rod would be shifted to the left.

Figure 6:
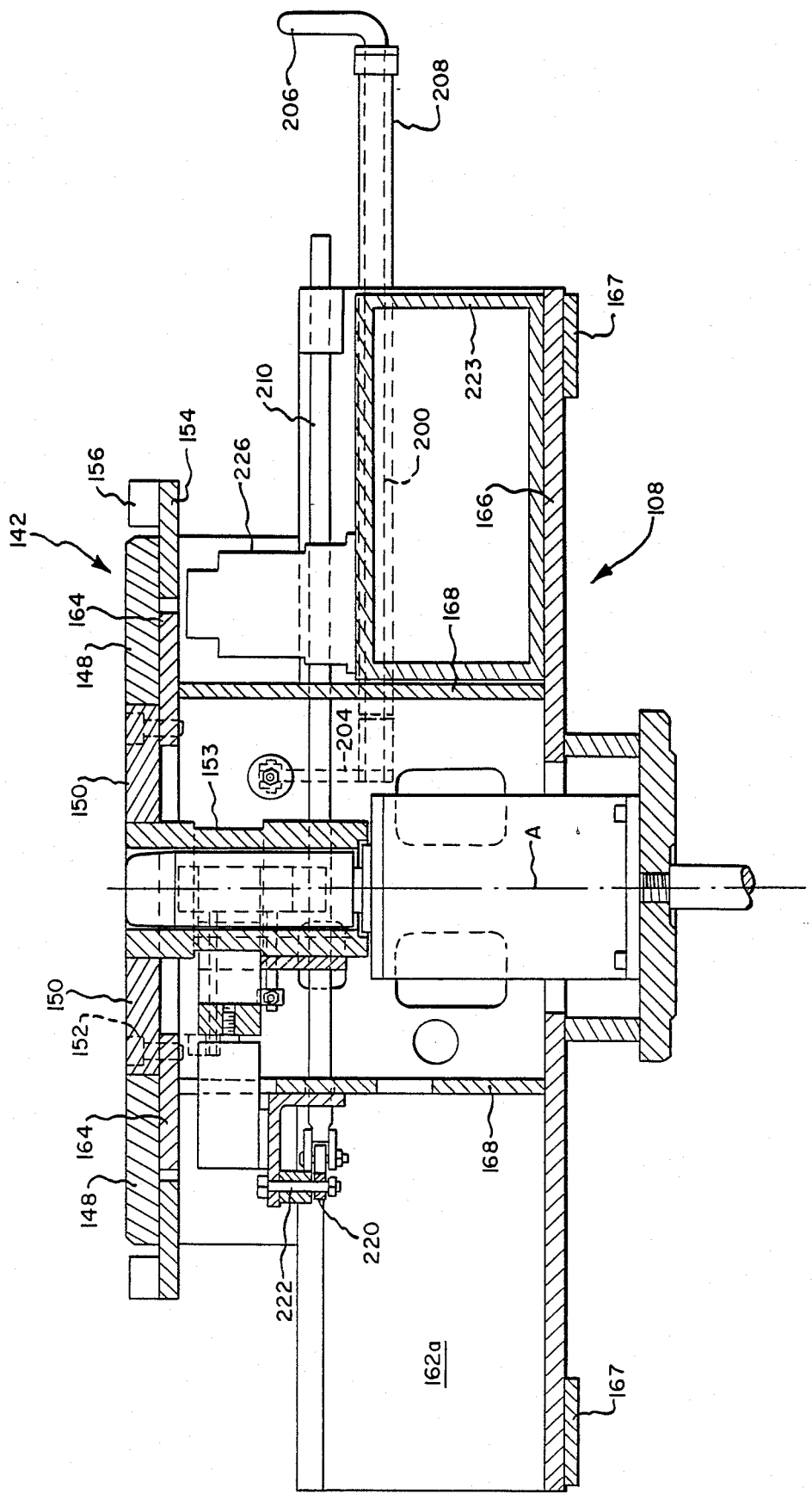
FIGS. 6 and 7 are sectional views taken generally along the lines 6—6 and 7—7 in FIG. 2.
Figure 9:
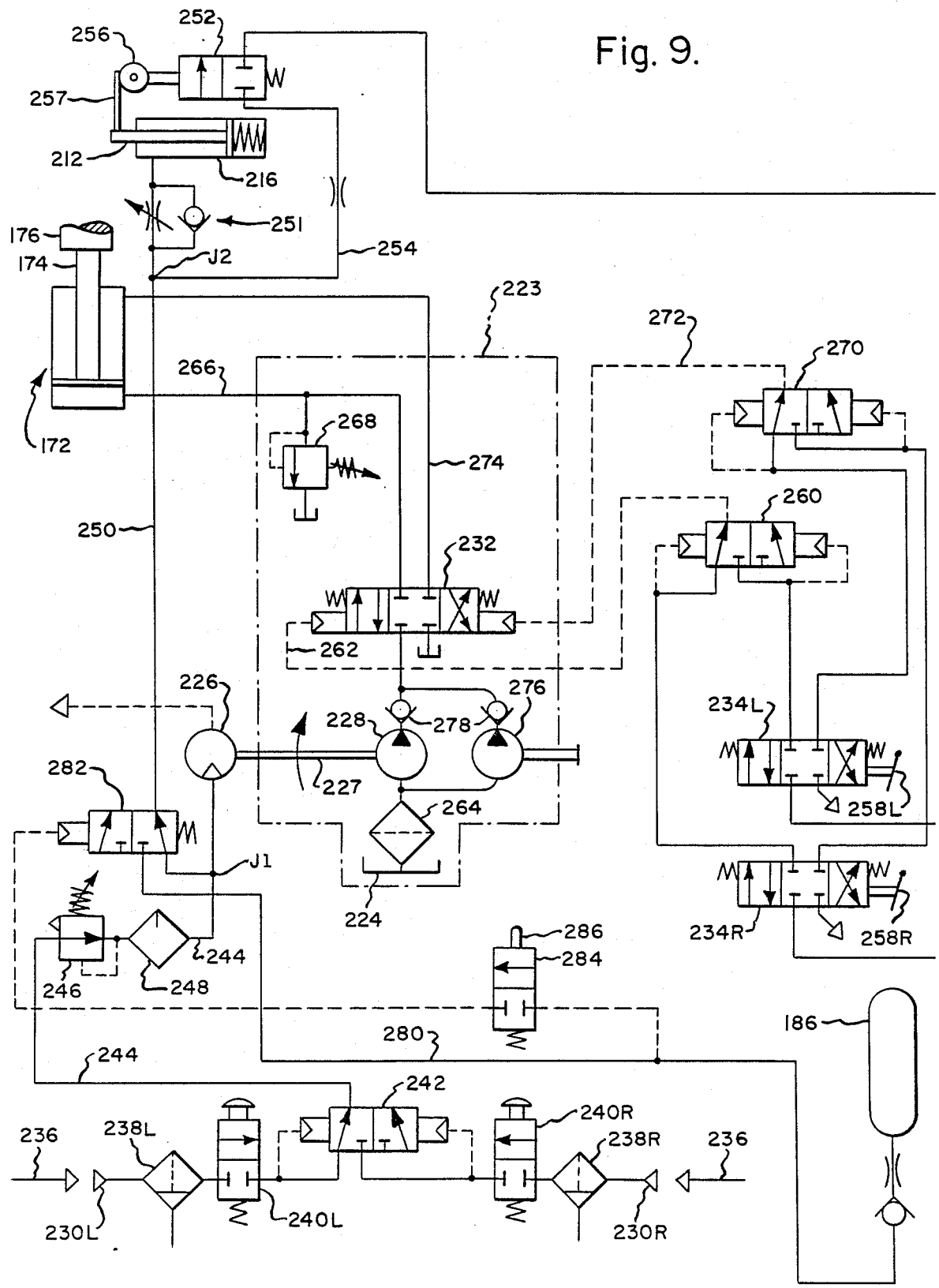
FIG. 9 is a hydraulic and pneumatic schematic.

The housing 223 for reservoir 224 for the hydraulic cylinder assembly 172 is mounted upon the lower plate 166 to the right of the right hand longitudinally extending plate member 168 as best shown in FIG. 6. Mounted above the housing 223 is an air motor 226 which is coupled by a power take-off shaft 227 (FIG. 9) to a pump 228 disposed within the housing. (The pump 228 as well as other various hydraulic components disposed within the housing 223 are not shown in detail but they are illustrated in the schematic diagram FIG. 9.)

The hydraulic pump 228 is powered by the air motor 226 as air is usually readily available in both trains and from highway tractors. The various air lines associated with the hydraulic system are only shown in FIG. 9 but it should be noted that as the railtruck assembly of this invention is to be bidirectional, inlet air couplings 230 are disposed to either side of the railtruck assembly. Before the various hydraulic and pneumatic components are described in detail, it should be noted that when it is desired to lower the coupler pin from its fully raised position, it is necessary to retract the fork member from beneath the coupler pin and also to drive the fluid pump 228 and deliver hydraulic fluid to the double acting cylinder assembly in such a manner that the pin 176 will be forced downwardly. Alternatively, when it is necessary to raise the coupler pin 176, the hydraulic fluid must be directed to the other end of the cylinder assembly. Thus it is necessary to provide a hydraulic control valve 232 which is capable of directing the output of the pump 228 to either the rod end or the anchor end of the cylinder assembly 172. As there is only a single hydraulic control valve 232, it is necessary to provide suitable control valves 234 to either side of the railtruck assembly, either of which control valves 234 can be operated to properly position the hydraulic control valve. Components disposed to the left side of the railtruck will be followed by the letter "L" and components disposed to the right hand side will be followed by the letter "R". A complete cycle of the operation of the coupler pin will now be described when an external air supply 236 is connected to the inlet air coupling 230L. Air will flow through a filter 238L provided with a suitable water trap, enabling valve 240L and pilot operated shuttle valve 242. As the enabling valve 240 is normally spring biased to a blocking position, it is necessary for the operator to engage a push bottom and hold the push button down for air to pass through the enabling valve and to operate the shuttle valve 242 permitting air to pass through line 244 to junction J1. Air will now flow from the pilot operated shuttle valve through an air pressure regulator 246 and air lubricator 248, and from junction J1 to air motor 226. Air will additionally flow from junction J1 through a branch line 250 (provided with junction J2) to the single acting spring biased air cylinder 216 which will cause the fork 212 to be shifted away from the axis of the coupler pin 176. To prevent the cylinder assembly 216 from "chattering" in the event that the pressure in line 250 is fluctuating, a check valve and variable restricter assembly 251 is provided in line 250 between junction J2 and the cylinder assembly 216. In order to prevent the operation of the hydraulic cylinder 172 until the fork 212 is in its fully retracted position, a blocking valve 252 is disposed in another branch line 254 which extends away from junction J2, the blocking valve normally being disposed in its blocking position. However, this valve can be shifted to an open position by means of a roller 256 which is engaged by structure 257 interconnected to the yoke 212 and which will shift the blocking valve 252 to its open position when the yoke is in its fully retracted position. Air will now be supplied to both of the control valves 234L and 234R. The operator will shift the lever 258L, which operates valve 234L, in the desired direction to shift the valve to its desired position wherein air will now be permitted to flow through the valve 234L, through the raise selector valve 260 and then through pilot line 262 which will shift the hydraulic control valve 232 to its desired position wherein the coupler pin may be raised. At that time, the air motor 226 is driving the hydraulic pump 228 which draws fluid from the reservoir 224 through filter 264, the pump discharging its output through line 266 which is connected to the anchor end of the cylinder assembly 172 causing the rod 174 to be extended outwardly of the cylinder. When valve 232 is in the neutral position, the air motor will stall and no oil will be pumped. This is to prevent frothing of oil when the pump is "short circuited". A pressure relief valve 268 is disposed within the housing 223 in connection with the line 266, the valve diverting excess fluid back to reservoir when either the pin has attained its fully raised position, or when the lift pressure exerted by the pin is excessive, as may be possible when the tongue and/or load bearing adapter plate are not properly positioned with respect to the rear end of the leading trailer. Thus, the load bearing locating plate should be latched within the second receiving means of the trailer so that the coupler pin 176 is in alignment with the spaced apart apertures in the first receiving means, and additionally, the tongue should be fully inserted within the first receiving means so that its forward aperture is also in alignment with the spaced apart apertures, the coupler pin and all of which various apertures being concentric with the axis A of the center plate bowl.

When the coupler pin is in its fully raised position, the operator need only release the lever 258L and the valve 234L will return to its centered blocking position. The push button on valve 240L will also be released and then, if there is no further need for air, the external air supply will be disconnected from the inlet air coupling 230L.

To lower the coupler pin, and assuming that air is coupled to the coupling 230L, the operator will again have to press down on the push button which operates valve 240L and move the lever 258L associated with valve 234L in the other direction causing air to be delivered to the "lower" selector valve 270. Of course air will not be delivered to the "lower" selector valve 270 until after the blocking valve 252 has been shifted by roller 256 to its unblocking position. Air discharged from the "lower" selector valve 270 will pass through pilot line 272 causing the hydraulic valve 232 to be shifted to its other position which will in turn cause hydraulic fluid to be delivered through line 274 to the rod end of the cylinder assembly 172 forcing the coupler pin downwardly.

Operation of the system so far described from the right hand side will be essentially the same except that it will be necessary to simultaneously operate the right enabling valve 240R and the right hand control valve 234R. When air is connected to the right hand coupler 230R and the enabling valve 240R permits air to be passed to the shuttle valve 242, the shuttle valve will be shifted to its other position by pilot line operation.

In case there is a situation where air is not available, a backup manual hydraulic pump 276 is provided. This pump can also be disposed within the housing 223 and is provided with lines which extend to either side of the pump 228. In order to prevent back flow to either pump when the other pump is operating, check valves 278 are provided. As it is necessary to provide air to the single acting spring biased air cylinder 216 a tap is provided off the brake air reservoir 186 which can be used for the purpose of actuating the cylinder 216. To this end a spring biased pilot operated selector valve 282 is provided in the branch line 250 which extends to the cylinder 216, the selector valve normally being spring biased to a positive where external air will pass through the selector valve but which may be pilot operated to permit air to flow from the reservoir 186 when desired. An enabling valve 284, essentially of the same design as the valves 240, is provided in the pilot line, the valve 284 preventing operation of the selector valve 282 until engaged. In actual practice the control 286 for valve 284 will be engaged by the operating handle provided for operating the pump 276 when the handle is inserted within its receiving socket. It will also be necessary for the operator to engage one of the control levers 258.

Figure 10:
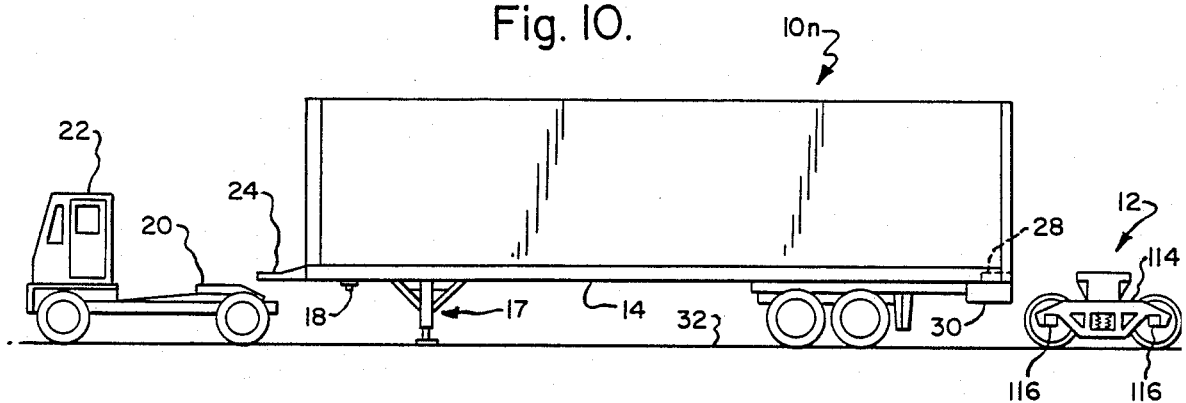
FIGS. 10-13 are views illustrating how a unit train of highway trailers and railtrucks may be made up.
Figure 13:
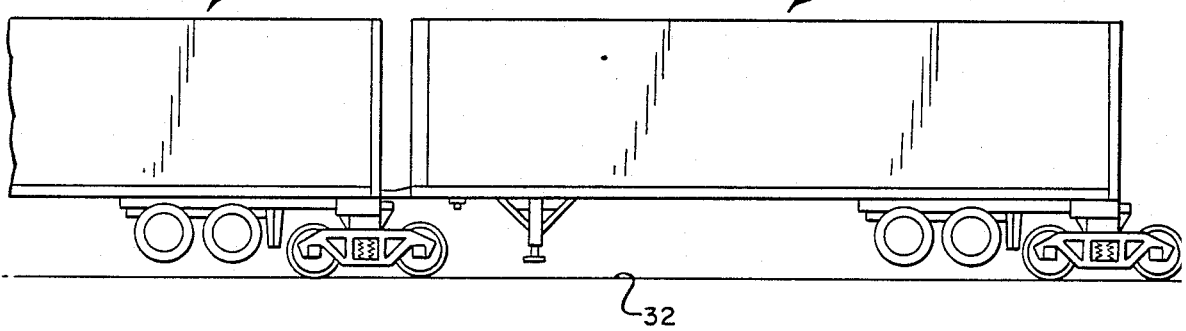

The manner in which a unit railway train of highway vehicles is assembled is illustrated in FIGS. 10-13 and a manner in which they are broken up would follow the reverse procedure of FIGS. 13-10. As it is believed the manner of assembly and disassembly should be obvious only a brief description will be given. The kingpin 18 of a trailer will be engaged by the fifth wheel assembly 20 on tractor 22 and the highway wheel elevating system 34 is operated to cause the body 14 of the trailer to be raised. The highway trailer is now backed towards the railtruck assembly 12 until the load bearing locating means 142 is fully received within the second receiving means 30 of the trailer. (Alternatively the railtruck assembly 12 can be moved forwardly towards the trailer.) If the trailer is not in proper longitudinal alignment, engagement of the side surfaces 158 (FIG. 8) with the plates 82 (FIG. 3) will cause proper horizontal alignment. The relative motion of the railtruck assembly 12 and highway trailer towards each other will continue until the stops 156 (FIG. 8) engage plates 84 (FIG. 3), at this time the latch 188 (FIG. 8) engaging the latch bracket 96 (FIG. 3) to hold the load bearing and locating means 142 firmly within the second receiving means in such a manner that the parts cannot rotate relative to each other about a vertically extending axis. The elevating means 34 are then moved from the position shown in FIG. 11 to the position shown in FIG. 12 and after properly positioning the highway trailer on the track and after the adjustable support legs 17 are lowered, the tractor 22 is then disconnected from the kingpin 18. After the wheel elevating system 34 has been moved to the raised position shown in FIG. 12, the rear flexible air line section 104 (FIG. 2) on highway trailer 10n is connected to the forwardly located flexible air line section 126 (FIG. 2) on the railtruck assembly 12. Another highway trailer is now connected to another railtruck assembly, this railtruck assembly being disposed forwardly of the first trailer assembled onto a railtruck (10n in FIGS. 10-13). The leading trailer (10n-1) and associated railtruck assembly are now backed towards the first highway trailer (10n) assembled onto a railtruck until the tongue 24 of the following highway trailer (10n) is fully received within the first receiving means 28 of trailer 10n-1. At this time the coupler pin 176 is caused to be raised by the hydraulic cylinder assembly 172 either through the operation of an external air source or by operation of a manual pump. When the coupler pin is fully raised and the air source to cylinder 216 is disconnected, the indicator rods 210 (FIG. 8) will extend outwardly to indicate that the pin is fully raised. In addition, the fork 212 (FIG. 8) will be disposed beneath a portion of the coupler pin and prevent it from dropping in the event that there is a leak in the hydraulic system. It is now only necessary to connect the brake air line sections 102 and 104 on trailers 10n and 10n-1, respectively, to the associated brake lines 126 (FIG. 2) on the railtruck and to raise the support legs 17 of the trailer 10n and to lower the legs 17 of trailer 10n-1. The steps set forth above are continued until the unit train is fully made up. At this point, it is only necessary to connect the forwardly extending tongue 24 of the lead trailer 10a to the locomotive in the manner shown in FIG. 1, or through an intermediate rail transition vehicle (not shown). When connecting to a locomotive 11 an adapter 288 is provided, which adapter receives the tongue 24 of the leading trailer 10a, the adapter being secured to the locomotive coupler 290. The landing gear of the highway trailers in any mode of transport must be raised to clear either the rail or the highway. The manner of breaking up the train is essentially the reverse of the procedure set forth above, the only additional step being required is that the latch 188 (FIG. 8) must be swung from its engaged position to its disengaged position by operation of a latch operating handle 206 (FIG. 8).

By providing the symmetrical railtruck assembly 12 it is possible to readily mount the highway trailers onto the railtruck assemblies without turning the railtruck around. Thus, this design greatly facilitates the assembly of unit trains. In addition, by providing the double acting hydraulic cylinder 172, the connection and more importantly the disconnection of the trailers to and from each other is greatly facilitated.

While the coupler pin described above is caused to be raised and lowered by a hydraulic cylinder, an air operated jack, such as a worm gear driven screw jack, may be provided for operating the coupler pin. In addition, the yoke, which supports the coupler pin when in its fully raised position, may alternatively be operated manually.

Additionally, the air cylinder 216, which operates the safety latch 212, can be eliminated in which case the safety latch 212 can be operated by the indicator rods 210. If this is done, it will be necessary to eliminate the enabling valves 240. In addition, it will also be possible to eliminate the check valve and restrictor 251 and valve 252.

What is claimed is:

1. An improved railway train of highway trailers including leading and following trailers which are interconnected to each other, adjacent ends of said highway trailers being supported solely by railtruck assemblies, each of said highway trailers including a body, a forwardly extending load supporting tongue, rear tongue coupling means which receives and is removably coupled to the forward end of the forwardly extending tongue of an adjacent highway trailer and rear receiving means removably coupled to a load bearing portion of a railtruck assembly, and each of the railtruck assemblies including an intermodal adapter and a railtruck having longitudinally extending said frames and a transversely extending bolster supported on said side frames, the intermodal adapter being supported on said bolster for limited rotational movement about a generally vertically extension axis; characterized by said intermodal adapter being provided with first and second locating portions symmetrical about said axis and first and second coupling means also symmetrical about said axis, the first locating portion being received within said rear receiving means and being coupled thereto by said first coupling means, the second locating portion and second coupling means being provided so that after a railtruck assembly is disconnected from a leading trailer disposed to one side of the bolster, it may be coupled to a leading trailer disposed to the other side of the bolster.

2. An improved railtruck assembly for use in an improved railway train of highway trailers including leading and following trailers which are interconnected to each other, adjacent ends of said highway trailers being supported solely by railtruck assemblies, each of said highway trailers including a body, a forwardly extending load supporting tongue connectable to a leading trailer, first receiving means capable of receiving the forward end of a tongue of a following trailer, and second receiving means, and wherein said improved railtruck assembly is capable of being secured to an associated highway trailer initially disposed to either end of said railtruck assembly; said improved railtruck assembly including
   a railtruck including
   a pair of side frames, and
   a transversely extending bolster support on said side frames; and
an intermodal adapter supported on the bolster and including
   load bearing locating means having forwardly and rearwardly extending substantially identical locating portions, each one of said locating portions being capable of being received within the second receiving means of a leading highway trailer to cause the leading highway trailer and intermodal adapter to become aligned with each other upon relative movement towards each other, and
   forwardly and rearwardly extending securing means, either one of said securing means being capable of maintaining the associated locating means within said second receiving means of said highway trailer when in a completely mounted position.

3. An improved railtruck assembly capable of interconnecting a leading highway trailer to a following trailing highway trailer to form a train of highway trailers, each of said highway trailers including a body and at least one highway wheel assembly supported above a rail track, each following trailer including a forwardly extending load supporting apertured tongue, and each leading trailer including rear tongue receiving means having a pair of vertically spaced apart aligned apertures; said improved railtruck assembly including
   a railtruck having
   a pair of side frames, and
   a transversely extending bolster supported on said side frames for limited rocking movement; and
an intermodal adapter supported on said bolster and having
   a vertically shiftable coupler pin, and
   double acting hydraulic shifting means capable of moving the coupler pin from a lowered position to a raised position where it may pass through said spaced apart aligned apertures and said apertured tongue to couple leading and following trailers to each other and to the intermodal adapter, and to move the coupler pin from a raised position to a fully lowered position whereby the improved train of highway trailers may be broken up.

4. The improved railway train as set forth in claim 1 in which the intermodal adapter is further provided with a vertically shiftable coupler pin, which pin passes through spaced apart upper and lower apertured walls of the rear tongue coupling means with an apertured forward end of a load supporting tongue of another trailer to provide a relatively slackless coupling of one trailer to another in the railway train.

5. The improved railtruck assembly as set forth in claim 2 in which the railtruck assembly is provided with a service brake system (119) including, control valve (182), air reservoir (186), brake crossover piping (125), flexible air connectors (106,126), and shut-off cocks (187a,127).

6. The improved railtruck assembly as set forth in claim 2 wherein constant contact side bearings are mounted on the transverse bolster in contact with wear pads carried by said intermodal adapter.

7. The improved railtruck assembly as set forth in claim 2 wherein the load bearing locating means is configured to provide limited gathering and alignment capabilities when a locating portion of said load bearing and locating means and the second receiving means of the highway trailer are moved relatively towards each other.

8. The improved railtruck assembly as set forth in claim 2 wherein the load bearing locating means further includes an intermediate load bearing portion, one of said locating portions and the intermediate portion being disposed within the second receiving means of an associated trailer when in the completely mounted position.

9. The improved railtruck assembly as set forth in claim 8 wherein the intermediate portion has a top surface and the top surface of the intermediate portion and the forwardly and rearwardly extending substantially identical locating portions all lie in the same common horizontal plane.

10. The improved railtruck assembly as set forth in claim 2 wherein the intermodal adapter is further provided with a pair of stops disposed to the sides of the load bearing locating means, said stops being capable of engaging a portion of the second receiving means when the associated locating portion is disposed within the second receiving means in a completely mounted position.

11. The improved railtruck assembly as set forth in claim 10 wherein the stops each have a top surface and the top surface of each stop does not extend above the top surface of the load bearing locating means.

12. The improved railtruck assembly as set forth in claim 2 wherein the intermodal adapter is provided with a vertically shiftable coupler pin.

13. The improved railtruck assembly as set forth in claim 12 wherein said intermodal adapter is further provided with double acting hydraulic shift means operable to raise and lower said coupler pin.

14. The improved railtruck assembly as set forth in claim 3 or 13 wherein said double acting hydraulic shifting means includes a hydraulic cylinder coupled to said coupler pin, a hydraulic pump, the output of said pump being capable of being selectably directed to said hydraulic cylinder; said adapter further being provided with an air motor coupled to said pump and operable to drive said pump when said air motor is interconnected to a source of air.

15. The improved railtruck assembly as set forth in claim 14 wherein the intermodal adapter is further provided with a standby manual hydraulic pump means also interconnected to said hydraulic cylinder.

16. The improved railtruck assembly as set forth in claim 12 wherein said intermodal adapter is additionally provided with motor operated mechanical means for lifting and/or lowering said coupler pin.

17. The improved railtruck assembly as set forth in claim 3 or 12 wherein said intermodal adapter is further provided with a horizontally shiftable locking device disposable below a portion of the vertically shiftable coupler pin, said locking device, when it is in its horizontally shifted position below a portion of the vertically shiftable coupler pin, preventing accidental lowering of the coupler pin.

18. The improved railtruck assembly as set forth in claim 17 wherein said intermodal adapter is further provided with a pneumatic cylinder, said locking device being coupled to said pneumatic cylinder.

19. The improved railtruck assembly as set forth in claim 18 wherein the intermodal adapter is provided with an air motor capable upon operation of driving the hydraulic shifting means and thereby causing the vertically shiftable coupler pin to be moved either to a raised or a lowered position, said adapter being provided with a first air line extending to said air motor and a second air line extending from said first air line to said pneumatic cylinder whereby, when air is connected to said first line, it will cause operation of said pneumatic cylinder and said air motor, said pneumatic cylinder shifting the locking device away from the axis of said coupler pin.

20. The improved railtruck assembly as set forth in claim 17 wherein the intermodal adapter is further provided with manual operating means interconnected to said locking device for laterally shifting said locking device.

21. The improved railtruck assembly as set forth in claim 17 wherein said intermodal adapter is further provided with indicator means coupled to said locking device and capable of indicating when said locking device is disposed below a portion of said coupler pin to indicate when said coupler pin is fully raised.

22. The improved railtruck assembly as set forth in claim 12 wherein a hydraulic cylinder is interconnected to said coupler pin and capable of raising and lowering said coupler pin, and a manually operated hydraulic pump is interconnected to said cylinder and capable upon operation of causing said coupler pin to either be raised or to be lowered.

23. The improved railtruck assembly as set forth in claim 3 or 12 in which the vertically shiftable coupler pin is tapered at its upper end to facilitate its entry into the first receiving means on the trailer and into the apertured tongue of an associated following trailer.

24. The improved railtruck assembly as set forth in claim 12 wherein the bolster is provided with a center plate bowl, the intermodal adapter being provided with a center plate received within said center plate bowl, the axis of the coupler pin and the center plate bowl being concentric, and said forwardly and rearwardly extending locating portions and securing means being symmetrical about said vertically extending axis.

25. The improved railtruck assembly as set forth in claim 2 wherein said transversely extending bolster is provided with a center plate bowl, the intermodal adapter being provided with a center plate which rests within and rotates upon the center plate bowl, said railtruck assembly further being characterized by the provision of restraining means extending between the bolster and the intermodal adapter which allow the adapter to rotate on the center plate bowl but prevents the adapter from rocking out of the center plate bowl when generally horizontal and longitudinally extending force is applied near the top of the intermodal adapter.

26. The improved railtruck assembly as set forth in claim 2 wherein each of the locating portions match at least a portion of the configuration of the second receiving means on the trailer.

27. The improved railtruck assembly as set forth in claim 2 including means for releasing the forwardly extending securing means extending to one side of the railtruck assembly and including means for releasing the rearwardly extending securing means extending to the other side of the railtruck assembly.

28. The improved railtruck assembly as set forth in claim 2 wherein the railtruck assembly is provided with an air operated service brake system including an air reservoir and brake valve, said railtruck assembly further being provided with a rail brake air line connectible to leading and following trailers, said rail truck additionally including an air line extending from the first mentioned air line and means disposed in said last mentioned air line for shutting off the associated service brake system in the railtruck while maintaining air flow through said air line to railtrucks behind.

29. The improved railtruck assembly as set forth in claim 28 wherein the railtruck assembly is provided with an air crossover pipe connectible to a train air brake air supply, said crossover pipe terminating at approximately diagonal corners of said railtruck assembly, the ends of said pipe being fitted with standard flexible railroad style air lines terminating in glad hand connectors.

30. The improved railtruck assembly as set forth in claim 2 wherein the intermodal adapter includes releasable pin means which engages a means within the second receiving means of a trailer to provide a primary latch means between the adapter and the second receiving means and to provide a means for reacting against and resisting rotational movement of said adapter relative to the trailer upon application of railway brakes in the rail mode.

31. The improved railtruck assembly as set forth in claim 2 in which the railtruck assembly is provided with a service brake system (119) including, control valve (182), air reservoir (186), brake crossover piping (125), flexible air connectors (106,126), and shut-off cocks (187a,127).

32. An improved highway trailer for use in an improved railway train of highway trailers which are interconnected to each other, adjacent ends of highway trailers being supported by railtruck assemblies, each of said railtruck assemblies including an intermodal adapter and a railtruck having longitudinally extending side frames and a transversely extending bolster supported on said side frames, the intermodal adapter being supported on said bolster for limited rotational movement about a generally vertically extending axis, each adapter including a pair of opposed locating portions symmetrical about said axis, each of said highway trailers including a body, a forwardly extending load bearing apertured tongue adapted to be connected to another highway trailer disposed forwardly of said tongue, first receiving means at the rear of the highway trailer adapted to receive the forwardly extending tongue of a trailer disposed behind said first receiving means, and second receiving means disposed below said first receiving means; said improved highway trailer being characterized by said second receiving means including gathering sidewalls and laterally spaced apart stop surfaces adapted to contact stop portions carried by the intermodal adapter when a locating portion is fully received within said second receiving means.

33. The improved highway trailer as set forth in claim 32 wherein the highway trailer body is of a monocoque type construction.

34. The improved highway trailer as set forth in claim 32 wherein said highway trailer is provided with at least one wheel assembly, vertically shifting means extending between said wheel assembly and said highway trailer and capable of raising the body of said highway trailer when the wheel assembly is resting upon the surface of the ground to facilitate the assembly of said highway trailer to a railtruck assembly, and, when so assembled, being capable of shifting the wheel assembly upwardly with respect to the trailer body so that the wheel assembly will be carried above the top of track rails when the highway trailer is formed into a unit train.

35. The improved highway trailer as set forth in claim 32 wherein said highway trailer is provided with a pair of load supporting, telescoping legs near its forward end for supporting the trailer when it is not supported by either an associated highway tractor, or another trailer disposed to the front of said trailer to which said trailer is connected, said load supporting telescoping legs being mounted to either side of the longitudinal center line of the trailer and being spaced apart 4' 11¼", the lower end of each of said legs being provided with a plate configured in such a manner that it will provide centering means for the plates when resting upon the head of a track.

36. The improved highway trailer as set forth in claim 32 wherein the forwardly extending tongue is provided with a hardened and removable bushing, said bushing being provided with a vertically extending aperture of generally an hourglass cross section.

37. The improved highway trailer as set forth in claim 32 wherein the first receiving means is of the approximate shape of a trapezoidal box, with its longest side being at the rear of the trailer, and which consists of a forward vertical wall, two side vertical walls and upper and lower horizontal walls each with an aperture through which a coupler pin may pass thus putting the pin in double shear when connected to the apertured tongue of a following trailer.

38. The improved highway trailer as set forth in claim 37 in which the first receiving means is further provided with an elastomeric pad assembly supported on the lower horizontal wall, said pad assembly consisting of upper and lower apertured metal plates between which and to which is bonded an apertured resilient elastomeric pad, the load carrying tongue of a second trailer resting upon said pad assembly.

39. The improved highway trailer as set forth in claim 38 further characterized by the inner surface of the forward vertical wall of the first receiving means being provided with a hardened stop for the purpose of providing a surface which will locate the forward end of the load carrying tongue of a second trailer in the proper position so that the apertures in the upper and lower plates of the first receiving means will be in alignment with the aperture in the load bearing tongue to allow a coupler pin to pass through said apertures with ease.

40. The improved highway trailer as set forth in claim 32 in which the highway trailer is provided with an elongated steel air pipe of relatively large diameter running from the front to rear of the trailer, said air pipe being independent of any other trailer piping and for the exclusive use of providing a continuous passageway for train air when the trailers are used in a railway train, said trailer air pipe being provided at its forward and rearward ends with lengths of flexible hose of the standard railroad type, said lengths of flexible hose terminating at their free ends in standard railroad "glad hand" air connectors.

41. The improved highway trailer as set forth in claim 32 wherein said second receiving means further includes a rearwardly extending nose portion, said nose portion including a secondary vertical surface adapted to be engaged by primary latch means carried by said intermodal adapter to hold a locating portion of an intermodal adapter within the second receiving means.

42. The improved highway trailer as set forth in claim 32 wherein said highway trailer is further provided with air brakes (119), an air line (125) running to said brakes, a tee in said air line, and a secondary air line running from said tee, said secondary air line being provided with an air take-off connection (187) at its end remote from said tee, said air take-off connection (187) being provided with a shut-off valve (187a).

43. A railtruck assembly for use in a railway train of highway trailers including leading and following trailers which are interconnected to each other, adjacent ends of said highway trailers being supported solely by a railtruck assembly, each of said highway trailers including a body, and wherein said railtruck assembly is capable of being secured to an associated highway trailer initially disposed to either end of said railtruck assembly; said railtruck assembly including a pair of side frames, and a transversely extending bolster supported on said side frames; and
- an adapter supported on the bolster and including load bearing locating means having forwardly and rearwardly extending substantially identical locating portions;
- each one of said locating portions having opposing substantially vertical, forwardly converging, sidewalls and an upwardly facing load bearing surface;
- a receiving means beneath the end of the trailer body having opposing substantially vertical forwardly converging sidewalls and a downwardly facing load bearing surface;
- each one of said locating portions being capable of being received within the receiving means on the highway trailer to cause the highway trailer and adapter to become aligned with each other upon relative movement towards each other so that the trailer can be mounted on the adapter; and
- securing means capable of securing the associated locating means to the receiving means of said highway trailer when in a mounted position.

44. A railtruck assembly according to claim 43 in which each locating portion load bearing surface and the receiving means load bearing surface are substantially horizontal surfaces adapted to contact one another when in said mounted position.

* * * * *

UNITED STATES PATENT AND TRADEMARK OFFICE
CERTIFICATE OF CORRECTION

PATENT NO. : 4,841,872

DATED : June 27, 1989

INVENTOR(S) : HARRY O. WICKS ET AL

It is certified that error appears in the above-identified patent and that said Letters Patent is hereby corrected as shown below:

In the face sheet, under "U.S. Patent Documents" change "2,035,535" to -- 2,036,535 -- and "4,474,707" to -- 4,574,707 --; column 6, line 23, change "than" to -- that --; column 12, line 54, change "said" to -- side --, line 58, change "extension" to -- extending --; column 14, line 48, change "shift" to -- shifting --.

Signed and Sealed this

Twenty-seventh Day of February, 1990

Attest:

JEFFREY M. SAMUELS

Attesting Officer     Acting Commissioner of Patents and Trademarks